US012230867B2

(12) United States Patent
Varnoosfaderani

(10) Patent No.: US 12,230,867 B2
(45) Date of Patent: Feb. 18, 2025

(54) SLANT CROSS-POLARIZED ANTENNA ARRAYS COMPOSED OF NON-SLANT POLARIZED RADIATING ELEMENTS

(71) Applicant: Outdoor Wireless Networks LLC, Claremont, NC (US)

(72) Inventor: Mohammad Vatankhah Varnoosfaderani, Plano, TX (US)

(73) Assignee: Outdoor Wireless Networks, LLC, Claremont, NC (US)

( * ) Notice: Subject to any disclaimer, the term of this patent is extended or adjusted under 35 U.S.C. 154(b) by 358 days.

(21) Appl. No.: 17/778,205

(22) PCT Filed: Nov. 30, 2020

(86) PCT No.: PCT/US2020/062573

§ 371 (c)(1),
(2) Date: May 19, 2022

(87) PCT Pub. No.: WO2021/118817

PCT Pub. Date: Jun. 17, 2021

(65) Prior Publication Data

US 2022/0416406 A1 Dec. 29, 2022

Related U.S. Application Data

(60) Provisional application No. 62/946,622, filed on Dec. 11, 2019.

(51) Int. Cl.
*H01Q 1/24* (2006.01)
*H01Q 1/38* (2006.01)
(Continued)

(52) U.S. Cl.
CPC ............... *H01Q 1/246* (2013.01); *H01Q 1/38* (2013.01); *H01Q 1/523* (2013.01); *H01Q 9/065* (2013.01);
(Continued)

(58) Field of Classification Search
CPC .......... H01Q 1/246; H01Q 1/38; H01Q 1/523; H01Q 19/108; H01Q 21/06; H01Q 21/24; H01Q 9/0407; H01Q 9/065
See application file for complete search history.

(56) References Cited

U.S. PATENT DOCUMENTS 10,879,605 B2 * 12/2020 Varnoosfaderani .... H01Q 21/26
11,777,227 B1 * 10/2023 Wink .................. H01Q 21/064 343/702
(Continued)

OTHER PUBLICATIONS

"International Search Report and Written Opinion of the International Searching Authority", International Application No. PCT/US2020/062573, Apr. 7, 2021, 13 pp.

*Primary Examiner* — Thien M Le
(74) *Attorney, Agent, or Firm* — Myers Bigel, P.A.

(57) ABSTRACT

Base station antennas include first and second radio frequency ("RF") ports and a first antenna array that includes both first and second radiating elements. Each of the first radiating elements includes a first radiator that is connected to the first RF port that is configured to radiate at a first polarization and a second radiator that is connected to the second RF port that is configured to radiate at the first polarization. Each of the second radiating elements includes a first radiator that is connected to the first RF port that is configured to radiate at a second polarization that is different from the first polarization and a second radiator that is connected to the second RF port that is configured to radiate at the second polarization.

20 Claims, 6 Drawing Sheets

(51) Int. Cl.

| | |
|---|---|
| ***H01Q 1/52*** | (2006.01) |
| ***H01Q 9/06*** | (2006.01) |
| ***H01Q 19/10*** | (2006.01) |
| ***H01Q 21/06*** | (2006.01) |
| ***H01Q 21/24*** | (2006.01) |

(52) U.S. Cl.
CPC ........... *H01Q 19/108* (2013.01); *H01Q 21/06* (2013.01); *H01Q 21/24* (2013.01)

(56) References Cited

U.S. PATENT DOCUMENTS

| | | | | |
|---|---|---|---|---|
| 2007/0085741 | A1 | 4/2007 | Rafi et al. | |
| 2018/0323513 | A1 | 11/2018 | Varnoosfaderani et al. | |
| 2018/0331419 | A1 | 11/2018 | Varnoosfaderani et al. | |
| 2019/0013580 | A1* | 1/2019 | Vigano ................ | H01Q 3/2658 |
| 2019/0028159 | A1* | 1/2019 | Bisiules ................... | H01Q 5/48 |
| 2019/0273315 | A1 | 9/2019 | Hu et al. | |
| 2020/0395664 | A1* | 12/2020 | Athley ................. | H04B 7/0617 |
| 2021/0175623 | A1* | 6/2021 | Foglia Manzillo .. | H04B 1/0096 |
| 2021/0280986 | A1* | 9/2021 | Cui .......................... | H01Q 5/40 |
| 2021/0367357 | A1* | 11/2021 | Jia .......................... | H01Q 1/241 |
| 2022/0173504 | A1* | 6/2022 | Meyer .................. | H01Q 19/108 |
| 2023/0238707 | A1* | 7/2023 | Wu ........................ | H01Q 21/24<br>343/702 |
| 2023/0291121 | A1* | 9/2023 | Mondi ................... | H01Q 3/267 |
| 2023/0291123 | A1* | 9/2023 | Kasani ................... | H01Q 1/246 |

* cited by examiner

SLANT CROSS-POLARIZED ANTENNA ARRAYS COMPOSED OF NON-SLANT POLARIZED RADIATING ELEMENTS

CROSS-REFERENCE TO RELATED APPLICATIONS

The present application is a 35 U.S.C. § 371 national stage application of PCT Application No. PCT/US2020/062573, filed on Nov. 30, 2020, which itself claims priority to U.S. Provisional Patent Application Ser. No. 62/946,622, filed Dec. 11, 2019, the entire contents of both of which are incorporated herein by reference as if set forth fully herein in their entireties.

BACKGROUND

The present invention generally relates to radio communications and, more particularly, to antenna arrays for base station antennas used in cellular communications systems.

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers that are within the cell served by the base station. Many cells are divided into "sectors." In perhaps the most common configuration, a hexagonally shaped-cell is divided into three 120° sectors, and each sector is served by one or more base station antennas that have an azimuth Half Power Beamwidth (HPBW) of approximately 65°. The base station antennas are often mounted on a tower, with the radiation patterns (also referred to herein as "antenna beams") that are generated by the base station antennas directed outwardly. Typically, a base station antenna includes multiple phase-controlled antenna arrays that each include a plurality radiating elements that are arranged in one or more vertical columns when the antenna is mounted for use. Herein, "vertical" refers to a direction that is perpendicular to the horizontal plane that is defined by the horizon. The phase controlled antenna arrays include columns of radiating elements in order to narrow the vertical or "elevation" beamwidth of the antenna beam, which may both increase the gain of the array and reduce interference with adjacent cells.

In order to increase the communication capacity of a base station, the antenna arrays are typically implemented using dual-polarized radiating elements. As known to those of skill in the art, RF signals may be transmitted at various polarizations such as horizontal polarization, vertical polarization, slant polarization, right hand circular polarization, etc. Certain polarizations are theoretically "orthogonal" to each other, meaning that an RF signal transmitted at a certain polarization will not interfere with an RF signal transmitted at an orthogonal polarization, even if both signals are transmitted at the same frequency, from the same location, in the same direction. Examples of orthogonal polarizations are vertical and horizontal polarizations or any other pair of linear polarizations that are offset from each other by 90 degrees, such as −45 degree and +45 degree slant polarizations. A dual-polarized radiating element refers to a radiating element that has first and second radiators that are configured to emit RF energy at two different, typically orthogonal, polarizations. In practice, the RF signals exhibit some level of interaction, but typically the RF signals transmitted at the orthogonal polarizations exhibit low levels of interference with each other.

Most base station antennas use slant −45°/+45° polarized radiating elements. These radiating elements are often implemented as so-called cross-dipole radiating elements, which include a first dipole radiator that extends at an angle of −45° with respect to a vertical axis when the base station antenna is mounted for use, and a second dipole radiator that extends at an angle of +45° with respect to this vertical axis. Each dipole radiator may include a pair of dipole arms that are center fed with an RF signal that is to be transmitted by the dipole radiator. Cross-polarized patch radiating elements are also widely used that transmit at −45° and +45° polarizations. The first and second radiators of a slant −45°/+45° polarized radiating element extend at angles of −45° and +45° with respect to a vertical axis. For example, FIG. 1 is a front view of a conventional cross-dipole radiating element 10 that includes a first dipole radiator 20-1 that extends at an angle of −45° with respect to a vertical axis V and a second dipole radiator 20-2 that extends at an angle of +45° with respect to the vertical axis V. Herein, when multiple like elements are provided, they may be assigned a two-part reference numeral and referred to individually by their full reference numeral (e.g., dipole radiator 20-2) and may be referred to collectively by the first part of their reference numeral (e.g., the dipole radiators 20). Each dipole radiator 20-1, 20-2 includes a respective pair of dipole arms 30-1, 30-2; 30-3, 30-4 that are center fed by respective first and second feeds that are formed on first and second feed stalks 22-1, 22-2. The currents flow along the dipole arms 30 and hence the currents flow in alignment with the respective desired polarizations.

Another method of generating slant −45°/+45° radiation is by exciting both a first horizontal radiating arm and a second vertical radiating arm simultaneously to generate the −45° polarization radiation, and by exciting a first horizontal radiating arm and a second vertical radiating arm simultaneously to generate the +45° polarization radiation. FIG. 2 is a schematic front view of a cross-dipole radiating element 50 that generates slant −45°/+45° polarized radiation in this manner.

As shown in FIG. 2, the cross-dipole radiating element 50 includes first and second dipole radiators 60-1, 60-2. Dipole radiator 60-1 includes first and second dipole arms 70-1, 70-2 that are arranged at 90° with respect to each other to form an L-shaped radiator and dipole radiator 60-2 includes third and fourth dipole arms 70-3, 70-4 that are also arranged at 90° with respect to each other to form a backward L-shaped radiator. Dipole radiators 60-1, 60-2 are mounted side-by-side as shown in FIG. 2. So-called "stalk" printed circuit boards or other feed structures 62-1, 62-2 may be used to mount each dipole arm 70 at the appropriate distance in front of the reflector and to feed RF signals to the dipole arms 70. As shown by the arrows in FIG. 2, dipole arms 70-1 and 70-2 will form a first antenna beam having a +45° polarization, while dipole arms 70-3 and 70-4 will form a second antenna beam having a −45° polarization. In the depicted embodiment, each dipole arm 70 is implemented using a printed circuit board and is implemented as a so-called "cloaked" dipole arm 70 that is formed as a plurality of widened conductive segments 72 that are connected by narrow inductive traces 74.

SUMMARY

Pursuant to embodiments of the present invention, base station antennas are provided that include first and second RF ports and a first antenna array that includes a plurality of first radiating elements and a plurality of second radiating elements. Each of the first radiating elements includes a first radiator that is configured to radiate at a first polarization that is connected to the first RF port and a second radiator that is configured to radiate at the first polarization that is connected to the second RF port, and each of the second radiating elements includes a first radiator that is configured to radiate at a second polarization that is connected to the first RF port and a second radiator that is configured to radiate at the second polarization that is connected to the second RF port. The second polarization is different from the first polarization.

In some embodiments, the first polarization may be a vertical polarization and the second polarization may be a horizontal polarization.

In some embodiments, the first antenna array may further include a feedboard, and one of the first radiating elements and one of the second radiating elements may be mounted on the feedboard.

In some embodiments, the first radiator may comprise a first radiating arm that extends at an angle of approximately −45° with respect to a vertical axis and a second radiating arm that extends at an angle of approximately +45° with respect to the vertical axis.

In some embodiments, the first radiating arm may comprise a first dipole arm and the second radiating arm may comprise a second dipole arm. In other embodiments, the first radiating arm may be a first slot in a conductive patch and the second radiating arm may be a second slot in the conductive patch.

In some embodiments, each first radiating element may include a first feed stalk and a first radiator unit and each second radiating element may include a second feed stalk and a second radiator unit, where the first and second radiator units are identical, and the first and second feed stalks are identical, and the first feed stalks connects to the first radiator units differently than the second feed stalks connects to the second radiator units.

In some embodiments, the first antenna array may further include a feedboard, and two of the first radiating elements and one of the second radiating elements may be mounted on the feedboard. In some embodiments, the feedboard may be configured to supply higher power RF signals to the second radiating element than to the either of the two of the first radiating elements.

In some embodiments, the first antenna array may further include a first feedboard that has two of the first radiating elements and one of the second radiating elements mounted thereon and a second feedboard that has one of the first radiating elements and two of the second radiating elements mounted thereon.

Pursuant to further embodiments of the present invention, base station antennas are provided that include an antenna array that has a plurality of first radiating elements that include first radiators that are configured to emit respective first sub-components of an RF signal at a first polarization and a plurality of second radiating elements that include first radiators that are configured to emit respective second sub-components of the RF signal at a second polarization. The antenna array is configured so that the first and second sub-components combine to form a radiation pattern having a third polarization that is different from the first and second polarizations.

In some embodiments, the first polarization may be a vertical polarization and the second polarization may be a horizontal polarization and the third polarization is a slant polarization that is about halfway between the vertical polarization and the horizontal polarization.

In some embodiments, each first radiating element may further include a second radiator that is configured to emit a respective first sub-component of a second RF signal at the first polarization and each second radiating element further may include a second radiator that is configured to emit a respective second sub-component of the second RF signal at the second polarization. The antenna array may be configured so that the first and second sub-components of the second RF signal combine to form a second radiation pattern having a fourth polarization that is different from the first, second and third polarizations.

Pursuant to still further embodiments of the present invention, base station antennas are provided that include a reflector and an antenna array that includes a plurality of radiating elements that extend forwardly from the reflector. Each radiating element has a first radiating arm that extends at an angle of about −45° from a first vertical axis that bisects the radiating element, a second radiating arm that extends at an angle of about +45° from the first vertical axis, a third radiating arm that extends at an angle of about +135° from the first vertical axis, and a fourth radiating arm that extends at an angle of about −135° from the first vertical axis. The base station antennas further include a first RF port that is coupled to the first and second radiating arms of each of a first subset of the radiating elements and to the second and third radiating arms of each of a second subset of the radiating elements.

In some embodiments, the base station antenna may further include a second RF port that is coupled to the third and fourth radiating arms of each of the first subset of the radiating elements and to the first and fourth radiating arms of each of the second subset of the radiating elements.

In some embodiments, the base station antenna may further include a plurality of feedboards, where each feedboard includes at least one of radiating elements in the first subset and one of the radiating elements in the second subset.

In some embodiments, each of the first through fourth radiating arms may be a respective dipole arm or a respective slot in a conductive patch.

In some embodiments, each of the radiating elements may be substantially identical, and each of the radiating elements in the first subset may be oriented at a different rotation with respect to the radiating elements in the second subset. In some embodiments, each of the radiating elements in the first subset may be rotated by about 90° with respect to the radiating elements in the second subset.

Pursuant to still further embodiments of the present invention, feedboard assemblies for base station antennas are provided that include a printed circuit board that includes a first power divider that is coupled to a first RF input and a second power divider that is coupled to a second RF input, a first radiating element mounted to extend forwardly from the printed circuit board, the first radiating element having a first radiator that is coupled to a first output of the first power divider and a second radiator that is coupled to a first output of the second power divider, and a second radiating element mounted to extend forwardly from the printed circuit board, the second radiating element having a first radiator that is coupled to a second output of the first power divider and a second radiator that is coupled to a second output of the second power divider. The first and second radiators of the first radiating element are each configured to emit radiation having a vertical polarization, and the first and second radiators of the second radiating element are each configured to emit radiation having a horizontal polarization.

In some embodiments, the first radiator of the first radiating element may comprise a first radiating arm that extends at an angle of approximately −45° with respect to a vertical axis and a second radiating arm that extends at an angle of approximately +45° with respect to the vertical axis.

Pursuant to yet additional embodiments of the present invention, base station antennas are provided that include a first antenna array that includes a first radiating element that has a first radiator that is coupled to a first RF port that is configured to emit vertically polarized radiation and a second radiator that is coupled to a second RF port that is configured to emit vertically polarized radiation, a second antenna array that includes a second radiating element that has a first radiator that is coupled to a third RF port that is configured to emit horizontally polarized radiation and a second radiator that is coupled to a fourth RF port that is configured to emit horizontally polarized radiation. The first radiating element is horizontally aligned with the second radiating element when the base station antenna is mounted for use.

In some embodiments, the first antenna array may further include a third radiating element that has a first radiator that is coupled to the first RF port that is configured to emit horizontally polarized radiation and a second radiator that is coupled to the second RF port that is configured to emit horizontally polarized radiation, and the second antenna array may further include a fourth radiating element that has a first radiator that is coupled to the third RF port that is configured to emit vertically polarized radiation and a second radiator that is coupled to the fourth RF port that is configured to emit vertically polarized radiation. The third radiating element may be horizontally aligned with the fourth radiating element.

In some embodiments, the first and third radiating elements may be mounted on a first feedboard, and the second and fourth radiating elements may be mounted on a second feed board.

DETAILED DESCRIPTION

Pursuant to embodiments of the present invention, slant −45°/+45° polarized antenna arrays are provided that include radiating elements that are configured to emit vertically and horizontally polarized radiation. First radiating elements of the antenna array may be connected to first and second feed points of the feed network for the antenna array. The first feed point may be connected to a first RF port and the second feed point may be connected to a second RF port. Each first radiating element has first and second feed lines that are connected to the first feed point and third and fourth feed lines that are connected to the second feed point. The first and second feed lines excite respective first and second adjacent slant positioned radiator arms (e.g., slots, dipoles, etc.) of the first radiating elements, where the first and second radiator arms are excited either in-phase or out-of-phase, to generate a vertically polarized radiation pattern using the first and second radiators. The third and fourth feed lines excite respective third and fourth adjacent slant positioned radiator arms (e.g., slots, dipoles, etc.) of the first radiating elements, where the third and fourth radiators are excited either in-phase or out-of-phase, to generate a vertically polarized radiation pattern using the third and fourth radiator arms. Thus, the overall current flowing on each first radiating element in the antenna array flows in a vertical direction. Each second radiating element has first and second feed lines that are connected to the first feed point and third and fourth feed lines that are connected to the second feed point. The first and second feed lines excite respective first and second adjacent slant positioned radiator arms (e.g., slots, dipoles, etc.) of the second radiating elements, where the first and second radiators are excited either in-phase or out-of-phase, to generate a horizontally polarized radiation pattern using the first and second radiator arms. The third and fourth feed lines excite respective third and fourth adjacent slant positioned radiator arms (e.g., slots, dipoles, etc.) of the second radiating elements, where the third and fourth radiators are excited either in-phase or out-of-phase, to generate a horizontally polarized radiation pattern using the third and fourth radiator arms. Thus, the overall current flowing on each second radiating element in the antenna array flows in a horizontal direction.

Figure 1:
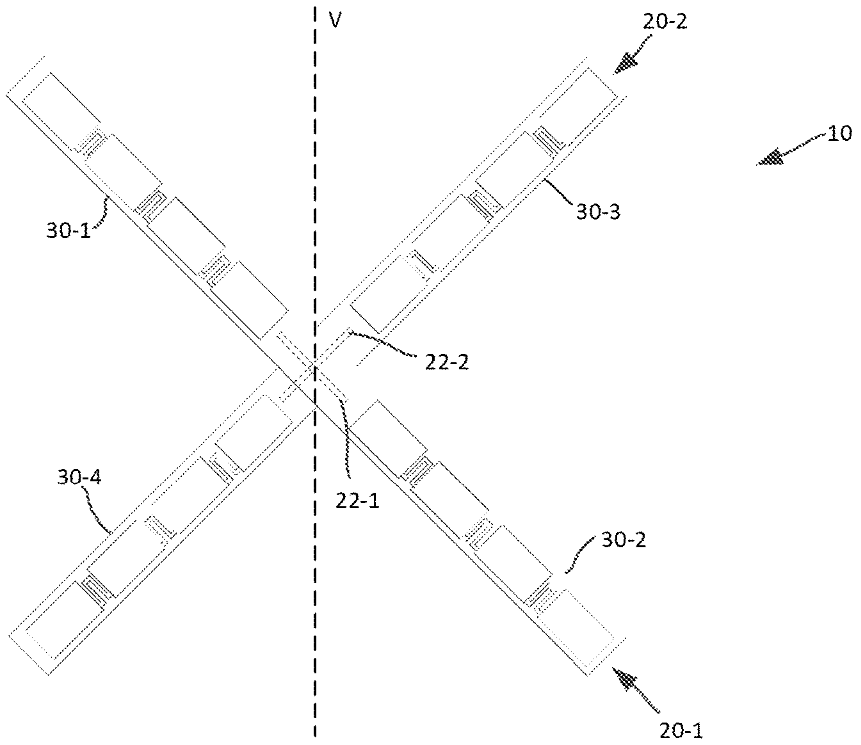
FIG. 1 is a front view of a conventional cross-dipole radiating element that directly generates slant −45°/+45° polarized radiation.
Figure 2:
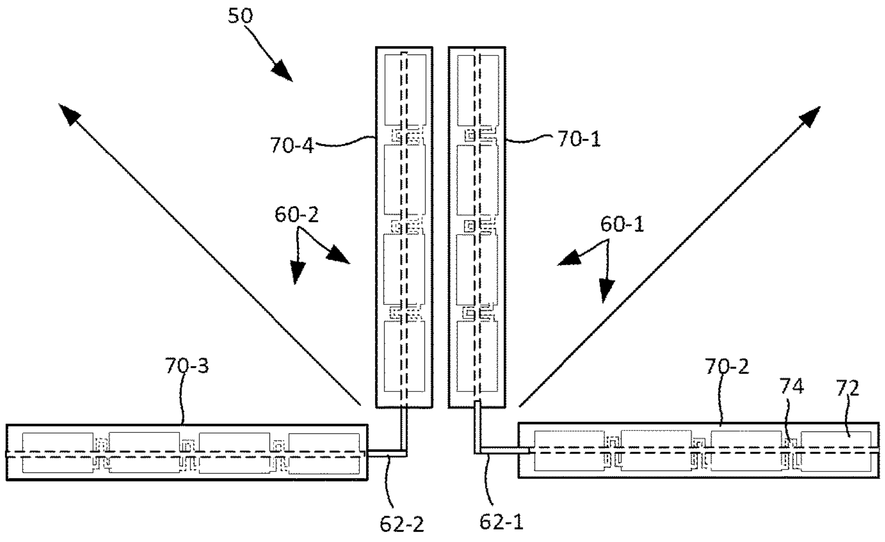
FIG. 2 is a front view of another conventional cross-dipole radiating element that generates slant −45°/+45° polarized radiation using horizontally and vertically arranged dipole arms.

The antenna arrays according to embodiments of the present invention may have a number of advantages. First, conventional cross-dipole radiating elements that directly radiate at slant −45°/+45° polarizations (see, e.g., FIG. 1) typically have crossover feeds in the center of the radiating element. This crossover arrangement increases the complexity of the feed network and may create asymmetries between the two polarizations, which may negatively effect isolation between the two polarizations. The radiating elements used in the antenna arrays according to embodiments of the present invention need not have crossover feed arrangements, and hence may avoid this potential problem with conventional cross-dipole radiating elements that directly radiate at slant −45°/+45° polarizations. Second, the antenna arrays according to embodiments of the present invention may exhibit improved intra-array isolation when two of these antenna arrays are mounted side-by-side.

In some embodiments of the present invention, antenna arrays are provided that include a plurality of first radiating elements and a plurality of second radiating elements. Each of the first radiating elements includes a first radiator that radiates at a first polarization that is connected to a first RF port and a second radiator that radiates at the first polarization that is connected to a second RF port, and each of the second radiating elements includes a first radiator that radiates at a second polarization that is connected to the first RF port and a second radiator that radiates at the second polarization that is connected to the second RF port. The RF ports may be RF ports of a base station antenna. The second polarization is different from the first polarization. The first polarization may be a vertical polarization and the second polarization may be a horizontal polarization (or vice versa) in some embodiments.

In other embodiments, base station antennas are provided that include an antenna array that has a plurality of radiating elements. The radiating elements include first radiating elements that have first radiators that are configured to emit respective first sub-components of an RF signal at a first polarization and second radiating elements that include first radiators that are configured to emit respective second sub-components of the RF signal at a second polarization. The antenna array is configured so that the first and second sub-components combine to form a radiation pattern having a third polarization that is different from the first and second polarizations. For example, the first polarization may be a vertical polarization, the second polarization may be a horizontal polarization, and the third polarization may be a slant polarization that is about halfway between the vertical polarization and the horizontal polarization.

In still other embodiments, base station antennas are provided that include a reflector and an antenna array that has a plurality of radiating elements that extend forwardly from the reflector. Each radiating element in the antenna array has a first radiating arm that extends at an angle of about −45° from a first vertical axis that bisects the radiating element, a second radiating arm that extends at an angle of about +45° from the first vertical axis, a third radiating arm that extends at an angle of about +135° from the first vertical axis, and a fourth radiating arm that extends at an angle of about −135° from the first vertical axis. A first RF port of the base station antenna is coupled to the first and second radiating arms of each of a first subset of the radiating elements and to the second and third radiating arms of each of a second subset of the radiating elements, and a second RF port is coupled to the third and fourth radiating arms of each of the first subset of the radiating elements and to the first and fourth radiating arms of each of the second subset of the radiating elements.

In any of the above-described embodiments, the antenna array may include a feedboard, and at least one of the first radiating elements and at least one of the second radiating elements may be mounted on the feedboard. In some embodiments, one first radiating element and one second radiating elements may be mounted on the feedboard. In other embodiments, two of the first radiating elements and one of the second radiating elements may be mounted on the feedboard. In some embodiments, the feedboard may be configured to supply higher power RF signals to the second radiating element than to either of the two of the first radiating elements. In other embodiments, two of the second radiating elements and one of the first radiating elements may be mounted on the feedboard. In some embodiments, the feedboard may be configured to supply higher power RF signals to the first radiating element than to either of the two of the second radiating elements. In other embodiments, the antenna array may include a first feedboard that has one of the first radiating elements and two of the second radiating elements mounted thereon, as well as a second feedboard that has one of the second radiating elements and two of the first radiating elements mounted thereon.

In some embodiments, each first radiator may include a first radiating arm that extends at an angle of approximately −45° with respect to a vertical axis that bisects the radiating element and a second radiating arm that extends at an angle of approximately +45° with respect to the vertical axis. Each radiating arm may comprise, for example, a dipole arm or a slot in a conductive patch.

Pursuant to further embodiments of the present invention, feedboard assemblies for a base station antenna are provided that include a printed circuit board that has a first power divider that is coupled to a first RF input and a second power divider that is coupled to a second RF input. A first radiating element is mounted to extend forwardly from the printed circuit board, the first radiating element having a first radiator that is coupled to a first output of the first power divider and a second radiator that is coupled to a first output of the second power divider. A second radiating element is also mounted to extend forwardly from the printed circuit board, the second radiating element having a first radiator that is coupled to a second output of the first power divider and a second radiator that is coupled to a second output of the second power divider. The first and second radiators of the first radiating element are each configured to emit radiation having a vertical polarization, and the first and second radiators of the second radiating element are each configured to emit radiation having a horizontal polarization.

Pursuant to yet additional embodiments of the present invention, base station antennas are provided that include a first antenna array that has a first radiating element and a second antenna array that has a second radiating element. The first radiating element includes a first radiator that is coupled to a first RF port and that is configured to emit vertically polarized radiation and a second radiator that is coupled to a second RF port and that is also configured to emit vertically polarized radiation. The second radiating element includes a first radiator that is coupled to a third RF port and that is configured to emit horizontally polarized radiation and a second radiator that is coupled to a fourth RF port and that is also configured to emit horizontally polarized radiation. The first radiating element is horizontally aligned with the second radiating element when the base station antenna is mounted for use.

Embodiments of the present invention will now be discussed in greater detail with reference to the accompanying figures.

Figure 3:
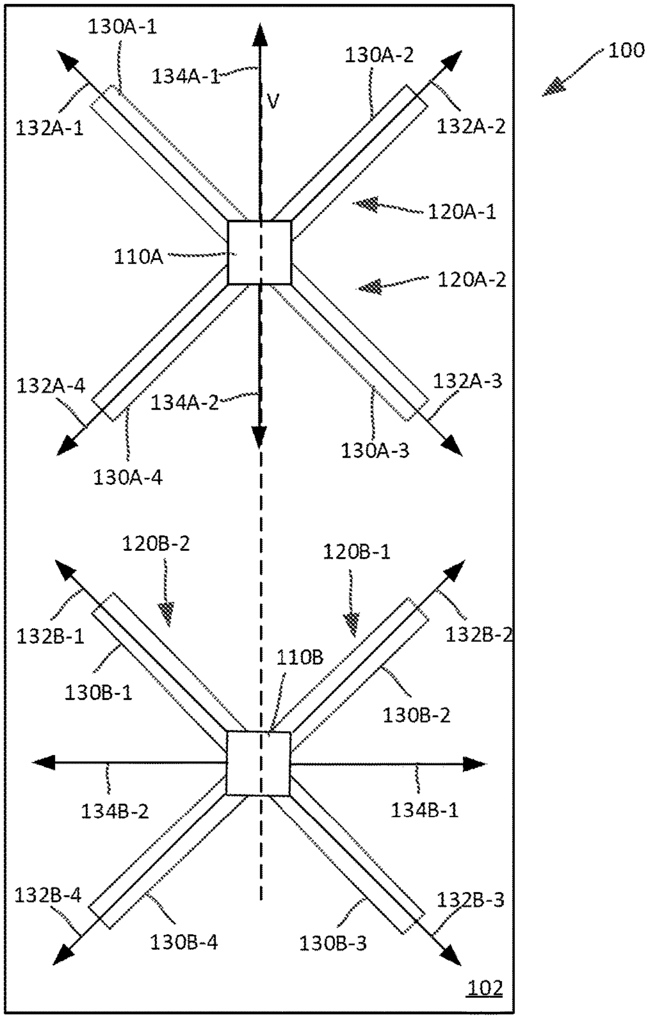
FIG. 3 is a schematic front view of an antenna array according to embodiments of the present invention that includes a first radiating element and a second radiating element.

FIG. 3 is a schematic front view of an antenna array 100 according to embodiments of the present invention that includes first and second radiating elements 110A, 110B. Radiating elements 110A and 110B may be mounted to extend forwardly from a reflector 102, and may be aligned along a vertically extending axis V when a base station antenna that includes antenna array 100 is mounted for normal use. While antenna array 100 includes a total of two radiating elements 110 as an example, it will be appreciated that each of the antenna arrays disclosed herein may include any appropriate number of radiating elements based on a desired application (e.g., gain requirements, elevation beamwidth requirements, etc.), and thus the number of radiating elements included in the antenna arrays may be anywhere from two to twenty or more.

The first radiating element 110A includes a first dipole radiator 120A-1 and a second dipole radiator 120A-2. Radiating element 110A is similar to the conventional radiating element 10 discussed above, but the dipole arms are fed in a different manner. In particular, dipole radiator 120A-1 includes a first pair of dipole arms 130A-1, 130A-2, where dipole arm 130A-1 extends at an angle of −45° with respect to the vertical axis V and dipole arm 130A-2 extends at an angle of +45° with respect to the vertical axis V. Dipole radiator 120A-2 includes a second pair of dipole arms 130A-3, 130A-4, where dipole arm 130A-3 extends at an angle of +135° with respect to the vertical axis V and dipole arm 130A-4 extends at an angle of −135° with respect to the vertical axis V. A first transmission line (not visible in the figure) may be used to feed RF signals from a first RF port to dipole arms 130A-1, 130A-2 and a second transmission line (not visible in the figure) may be used to feed RF signals from a second RF port to dipole arms 130A-3, 130A-4. Dipole arms 130A-1 and 130A-2 may be fed either in-phase or out-of-phase with respect to each other. Likewise, dipole arms 130A-3 and 130A-4 may be fed either in-phase or out-of-phase with respect to each other.

As shown by the arrows labelled 132A-1, 132A-2 in FIG. 3, currents will flow outwardly along dipole arms 130A-1 and 130A-2 when an RF signal is input to the first transmission line. As the same RF signal is fed to dipole arms 130A-1, 130A-2, based on superposition principles, the effective direction of the current flow on dipole radiator 120A-1 (which includes dipole arms 130A-1, 130A-2) is shown by the arrow labelled 134A-1. Arrow 134A-1 extends upwardly along vertical axis V, indicating that the RF signal emitted by dipole radiator 120A-1 has a vertical polarization. Similarly, identical RF signals are fed to dipole arms 130A-3, 130A-4 so that currents flow on dipole arms 130A-3, 130A-4 as shown by arrows 132A-3, 132A-4. Thus, the effective direction of the current flow on dipole radiator 120A-2 (which is shown by the arrow labelled 134A-2) extends downwardly along vertical axis V, indicating that the RF signal emitted by dipole radiator 120A-2 has a vertical polarization. Thus, radiating element 110A is configured to emit a pair of vertically polarized RF signals.

The second radiating element 110B similarly includes a first dipole radiator 120B-1 and a second dipole radiator 120B-2. Radiating element 110B is similar to radiating element 110A, but the dipole arms are fed in a different manner. In particular, dipole radiator 120B-1 includes a first pair of dipole arms 130B-2, 130B-3, where dipole arm 130B-2 extends at an angle of +45° with respect to a vertical axis V and dipole arm 130B-3 extends at an angle of +135° with respect to the vertical axis V. Dipole radiator 120B-2 includes a second pair of dipole arms 130B-4, 130B-1, where dipole arm 130B-4 extends at an angle of −135° with respect to the vertical axis V and dipole arm 130B-1 extends at an angle of −45° with respect to the vertical axis V. A first transmission line (not visible in the figure) may be used to feed RF signals from the first RF port to dipole arms 130B-2, 130B-3 and a second transmission line (not visible in the figure) may be used to feed RF signals from the second RF port to dipole arms 130B-4, 130B-1. Dipole arms 130B-2 and 130B-3 may be fed either in-phase or out-of-phase with respect to each other. Likewise, dipole arms 130B-4 and 130B-1 may be fed either in-phase or out-of-phase with respect to each other.

As shown by arrows 132B-2, 132B-3 in FIG. 3, currents will flow outwardly along dipole arms 130B-2 and 130B-3 when an RF signal is input to the first transmission line, and the effective direction of the current flow on dipole radiator 120B-1 (which is shown by arrow 134B-1) extends at an angle of 90° with respect to the vertical axis V, indicating that the RF signal emitted by dipole radiator 120B-1 has a horizontal polarization. Similarly, as shown by arrows 132B-4, 132B-1 in FIG. 3, currents will flow outwardly along dipole arms 130B-4 and 130B-1 when an RF signal is input to the second transmission line, and the effective direction of the current flow on dipole radiator 120B-2 (which is shown by arrow 134B-2) extends at an angle of −90° with respect to the vertical axis V, indicating that the RF signal emitted by dipole radiator 120B-2 has a horizontal polarization. Thus, radiating element 110B is configured to emit a pair of horizontally polarized RF signals.

As discussed above, dipole radiators 120A-1 and 120B-1 are connected to the same RF port and hence radiate sub-components of the same RF signal. Based on superposition principles, the RF signal having a vertical polarization emitted by dipole radiator 120A-1 of radiating element 110A combines with the RF signal having a horizontal polarization emitted by dipole radiator 120B-1 of radiating element 110B to provide a combined RF signal having a slant +45° polarization. Similarly, dipole radiators 120A-2 and 120B-2 are connected to the same RF port and hence, under superposition principles, the RF signal having a vertical polarization emitted by dipole radiator 120A-2 of radiating element 110A combines with the RF signal having a horizontal polarization emitted by dipole radiator 120B-2 of radiating element 110B to provide a combined RF signal having a slant −45° polarization. Thus, the antenna array 100 includes radiating elements 110A, 110B that are each designed to emit RF signals having vertical or horizontal polarizations, but the antenna array 100 as a whole will emit RF signals having slant −45°/+45° polarizations.

Figure 4A:
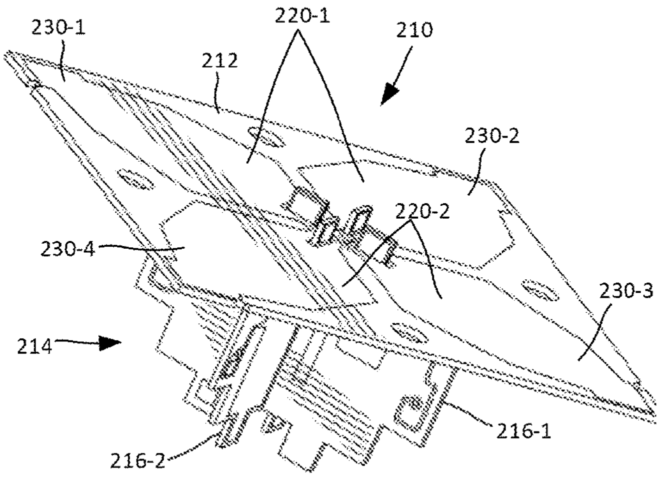
FIG. 4A is a perspective view of a cross-dipole radiating element that may be used to implement the first radiating element included in antenna array of FIG. 3.
Figure 4B:
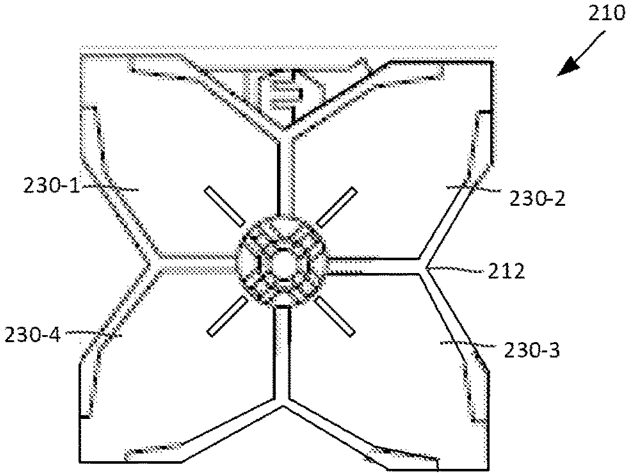
FIG. 4B is a front view of the radiator unit of the radiating element of FIG. 4A.
Figure 4C:
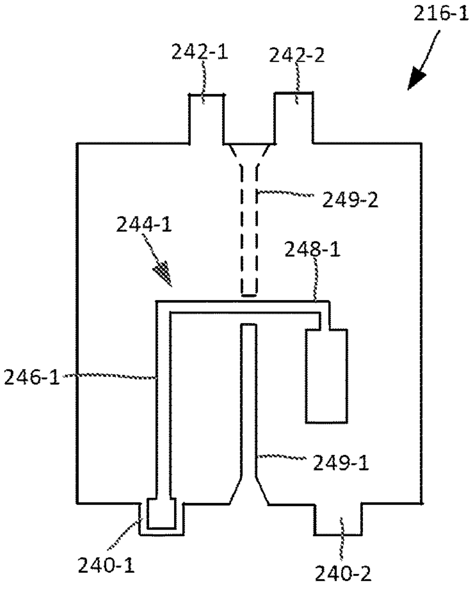
FIGS. 4C and 4D are views of the respective sides of one of the feed stalk printed circuit boards of the radiating element of FIG. 4A.
Figure 4D:
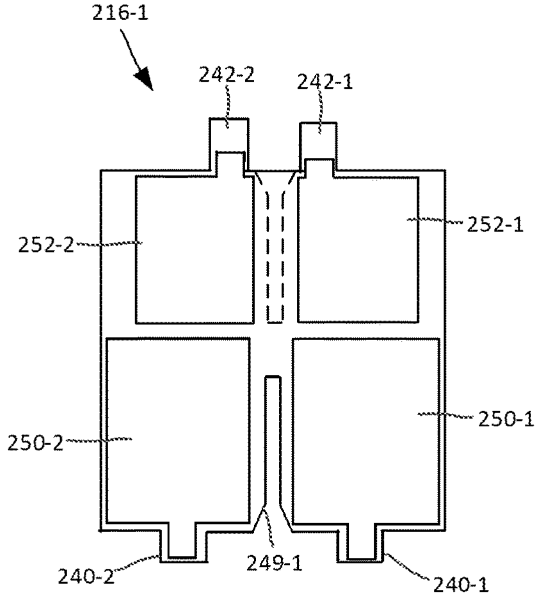

FIGS. 4A-4D illustrate a cross-dipole radiating element 210 that may be used to implement both of the radiating elements 110A, 110B included in antenna array 100. In particular, FIG. 4A is a perspective view of the radiating element 210, FIG. 4B is a front view of the radiator unit of radiating element 210, FIG. 4C is a view of one side of one of the feed stalk printed circuit boards included in radiating element 210A, and FIG. 4D is a view of the other side of the feed stalk printed circuit board of FIG. 4B.

As shown in FIGS. 4A and 4B, the radiating element 210 includes a radiating unit 212 and a feed stalk 214. In the depicted embodiment, the radiating unit 212 is implemented as a printed circuit board and the feed stalk 214 is implemented as a pair of feed stalk printed circuit boards 216-1, 216-2. The radiating unit 212 includes a pair of dipole radiators 220-1, 220-2. Dipole radiator 220-1 includes first and second dipole arms 230-1, 230-2, and dipole radiator 220-2 includes third and fourth dipole arms 230-3, 230-4.

Feed stalk printed circuit boards 216-1 and 216-2 each include a vertical slit so that the two feed stalk printed circuit boards 216 may be joined together to form the feed stalk 214. The radiating unit printed circuit board 212 is mounted on top of the feed stalk 214.

Referring to FIGS. 4C and 4D, feed stalk printed circuit board 216-1 includes a pair of rearwardly extending tabs

240-1, 240-2 and a pair of forwardly extending tabs 242-1, 242-2. The rearwardly extending tabs 240-1, 240-2 may, for example, extend through slots in a feedboard printed circuit board (FIG. 9) of the antenna array 100 that feeds RF signals to the radiating element 210. For example, the first rearwardly extending tab 240-1 of feed stalk printed circuit board 216-1 may be connected (directly or indirectly) to the center conductor of a first coaxial cable that is connected to a first RF port that feeds the antenna array 100. As shown in FIG. 4C, a trace 246-1 of a first microstrip transmission line 244-1 is printed on the first side of feed stalk printed circuit board 216-1 and is connected to the first rearwardly extending tab 240-1. The trace 246-1 terminates into a hook balun 248-1.

Referring to FIG. 4D, metal pads provided on the second side of the first and second rearwardly extending tabs 240-1, 240-2 of feed stalk printed circuit board 216-1 may be connected (directly or indirectly) to the outer conductor of the first coaxial cable. Pairs of rear and forward ground planes 250-1, 250-2, 252-1, 252-2 are printed on the second side of feed stalk printed circuit board 216-1. Referring to FIGS. 4C-4D, an RF signal input to trace 246-1 passes along the RF transmission line 244-1 to the hook balun 248-1. The RF energy splits at the hook balun 248-1 with about half of the RF energy flowing along ground plane 252-1 to forwardly extending tab 242-1 and the other half of the RF energy flowing along ground plane 252-2 to forwardly extending tab 242-2.

As shown best in FIGS. 4A and 4B, the forwardly extending tabs 242-1, 242-2 extend through slits in the radiating unit printed circuit board 212. The metal plating on tabs 242-1, 242-2 may be soldered to respective first and second input pads (not visible in the figures) that are provided on the rear side of radiating unit printed circuit board 212. The metal plating on tabs 242-1, 242-2 does not extend through the slits to the top side of the radiator unit printed circuit board 212. Respective first and second power dividers (not visible in the figures) are also provided on the rear side of radiating unit printed circuit board 212 and are coupled to the first and second input pads. The outputs of the first power divider feeds adjacent dipole arms 230-1, 230-2, while the outputs of the second power divider feed the other two (adjacent) dipole arms 230-3, 230-4. The outputs of the power dividers may be connected to the respective dipole arms 230 via, for example, plated through holes in the radiating unit printed circuit board 212 (not shown). Note that the same radiating element design 210 may be used to implement both radiating elements 110A and 110B of antenna array 100 simply by rotating the radiating elements 110B ninety degrees with respect to the radiating elements 110A when the radiating elements 110A, 110B are mounted to form the antenna array 100.

Feed stalk printed circuit board 216-2 may be identical to feed stalk printed circuit board 216-1, except that feed stalk printed circuit board 216-1 includes a slit 249-1 that extends forwardly from the rear edge of the printed circuit board, while feed stalk printed circuit board 216-2 includes a slit 249-2 that extends rearwardly from the forward edge of the printed circuit board. The location of the slit 249-2 that is included in feed stalk printed circuit board 216-2 is shown using a dotted line in FIGS. 4C and 4D so that FIGS. 4C and 4D may be viewed as picturing either feed stalk printed circuit board 216-1 or feed stalk printed circuit board 216-2.

Figure 5A:
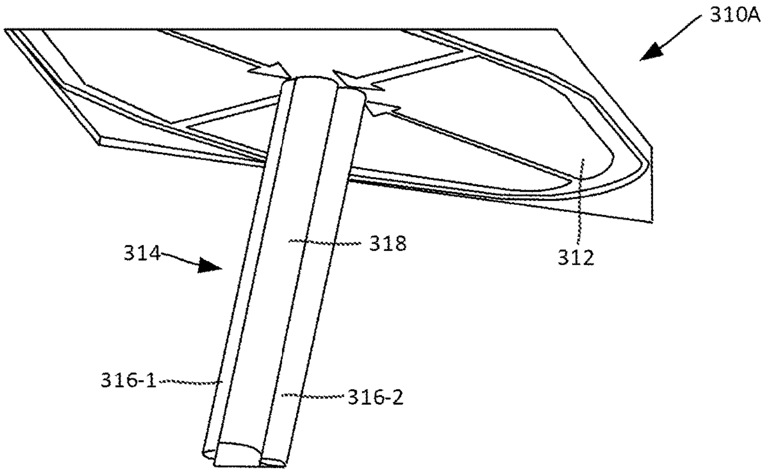
FIGS. 5A and 5B are a rear perspective view and a front view, respectively, of another radiating element that may be used to implement the first radiating element of the antenna array of FIG. 3.
Figure 5B:
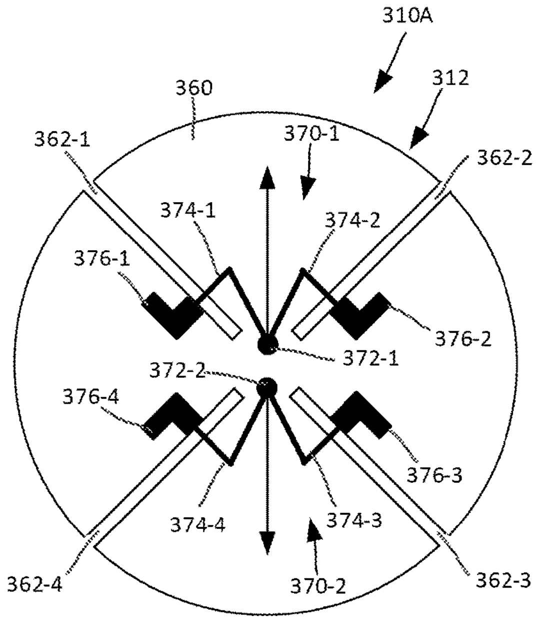
Figure 5C:
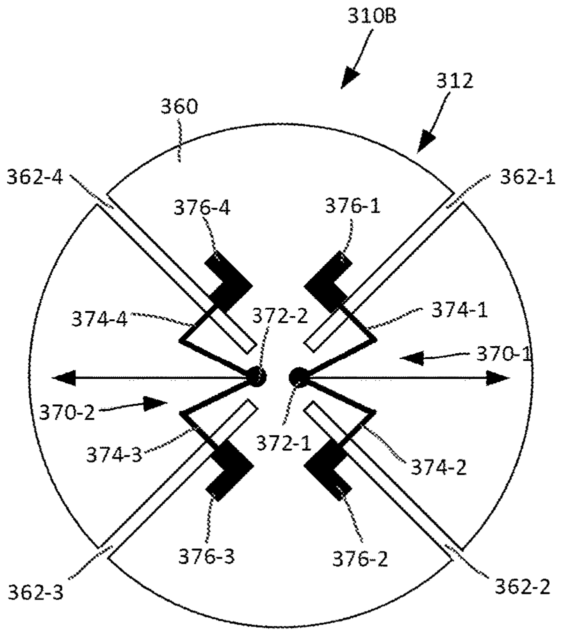
FIG. 5C is a front view of a radiating element that may be used to implement the second radiating element of the antenna array of FIG. 3.

FIGS. 5A and 5B are a rear perspective view and a front view, respectively, of a radiating element 310A that may alternatively be used to implement the radiating element 110A of FIG. 3. FIG. 5C is a front view of a radiating element 310B that may be used to implement the radiating element 110B of FIG. 3. The radiating element 310B may be identical to the radiating element 310A but rotated ninety degrees with respect to radiating element 310B when mounted in antenna array 100.

Referring to FIG. 5A, the radiating element 310A includes a radiating unit 312 and a feed stalk 314. The radiating unit 312 is implemented as a printed circuit board and the feed stalk 314 is implemented as a pair of feed coaxial cables 316-1, 316-2 that are mounted in a dielectric mounting support 318. The radiating unit printed circuit board 312 is mounted on top of the dielectric mounting support 318 and is electrically connected to the feed coaxial cables 316-1, 316-2.

Referring to FIG. 5B, the radiating unit 312 is implemented as a metal patch 360 that is formed on the rear side of the radiating unit printed circuit board 312. Four slots 362-1 through 362-4 are formed in the metal patch 360 by removing (or omitting) a section of the metallization, with each slot 362 extending to the outer circumference of the metal patch 360. Each slot 362 extends inwardly and terminates near the center of the metal patch 360.

As is further shown in FIG. 5B, first and second feed networks 370-1, 370-2 are formed on a front surface of the radiator unit printed circuit board 312. The first feed network 370-1 connects to the first feed coaxial cable 316-1, and the second feed network 370-2 connects to the second feed coaxial cable 316-2. The first feed network 370-1 comprises an input pad/power divider 372-1 that is electrically connected to the center conductor of the first feed coaxial cable 316-1, first and second transmission lines 374-1, 374-2 that extend from the input pad/power divider 372-1, and first and second quarter wavelength stub terminations 376-1, 376-2 that connect to the distal ends of the respective transmission lines 374-1, 374-2. The first transmission line 374-1 crosses the first slot 362-1 where it terminates into the first quarter wavelength stub termination 376-1. The second transmission line 374-2 crosses the second slot 362-2 where it terminates into the second quarter wavelength stub termination 376-2. The first slot 362-1 is adjacent the second slot 362-2.

The second feed network 370-2 comprises an input pad/power divider 372-2 that is electrically connected to the center conductor of the second feed coaxial cable 316-2, third and fourth transmission lines 374-3, 374-4 that extend from the input pad/power divider 372-2, and third and fourth quarter wavelength stub terminations 376-3, 376-4 that connect to the distal ends of the respective transmission lines 374-3, 374-4. The third transmission line 374-3 crosses the third slot 362-3 where it terminates into the third quarter wavelength stub termination 376-3. The fourth transmission line 374-4 crosses the fourth slot 362-4 where it terminates into the fourth quarter wavelength stub termination 376-4. The third slot 362-3 is adjacent the fourth slot 362-4.

When RF signals are fed to the slots 362-1, 362-2 via the transmission lines 374-1, 374-2, currents flow on the metal patch 360 in a direction midway between the two adjacent slots 362-1, 362-2 that are excited by the RF signal. Thus, as shown by the upper arrow in FIG. 5B, the antenna beam emitted by radiating element 310A in response to an RF signal fed to slots 362-1, 362-2 via the first coaxial cable 316-1 will have a vertical polarization. Similarly, when RF signals are fed to the two adjacent slots 362-3, 362-4 via the transmission lines 374-3, 374-4, currents flow on the metal patch 360 in a direction midway between the two slots 362-3, 362-4 that are excited by the RF signal. Thus, as shown by the lower arrow in FIG. 5B, the antenna beam emitted by radiating element 310A in response to an RF signal fed to slots 362-3, 362-4 via the second coaxial cable 316-2 will have a vertical polarization.

As shown in FIG. 5B, the transmission lines 374-1 through 374-4 need not cross over one another in order to feed their associated slots 362-1 through 362-4. As such, greater symmetry may be achieved between the first and second feed networks 370-1, 370-2 which may improve cross-polarization isolation. Adjacent slots 362-1 and 362-2 are fed in-phase in the embodiment of FIGS. 5A-5B, and adjacent slots 362-3 and 362-4 are fed in-phase in the embodiment of FIGS. 5A-5B. However, it will be appreciated that in other embodiments slots 362-1 and 362-2 may be fed out-of-phase and/or that slots 362-3 and 362-4 may be fed out-of-phase.

As shown best in FIG. 5C, radiating element 310B may be identical to radiating element 310A, but rotated ninety degrees with respect to radiating element 310A when mounted on a reflector in order to emit the RF radiation at polarizations that are 90° offset from the polarizations of the RF signals emitted by radiating element 310A.

It will be appreciated that the antenna arrays according to embodiments of the present invention may be implemented using any appropriate radiating element. For example, FIG. 6 illustrates an antenna array 400 according to further embodiments of the present invention which is formed using box dipole radiating elements.

Figure 6:
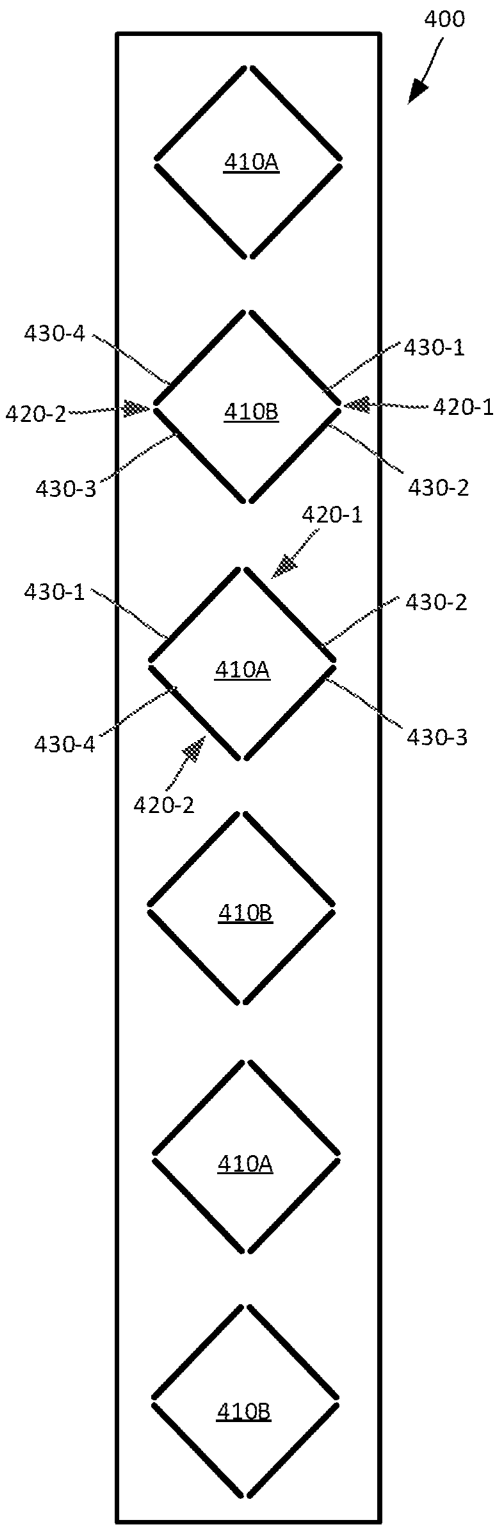
FIG. 6 is a schematic front view of an antenna array according to embodiments of the present invention that is implemented using box dipole radiating elements.

As shown in FIG. 6, the antenna array 400 includes alternating box dipole radiating elements 410A, 410B. Box dipole radiating elements 410A may be configured to generate vertically polarized radiation patterns in response to RF signals input at a first RF port and to likewise generate vertically polarized radiation patterns in response to RF signals input at a second RF port. Box dipole radiating elements 410B may be configured to generate horizontally polarized radiation patterns in response to RF signals input at a first RF port and to likewise generate horizontally polarized radiation patterns in response to RF signals input at a second RF port. As antenna array 400 will operate in the same fashion as antenna array 100 of FIG. 3, and simply uses a different style of radiating element (and includes a larger number of radiating elements), further description thereof will be omitted here.

Figure 7:
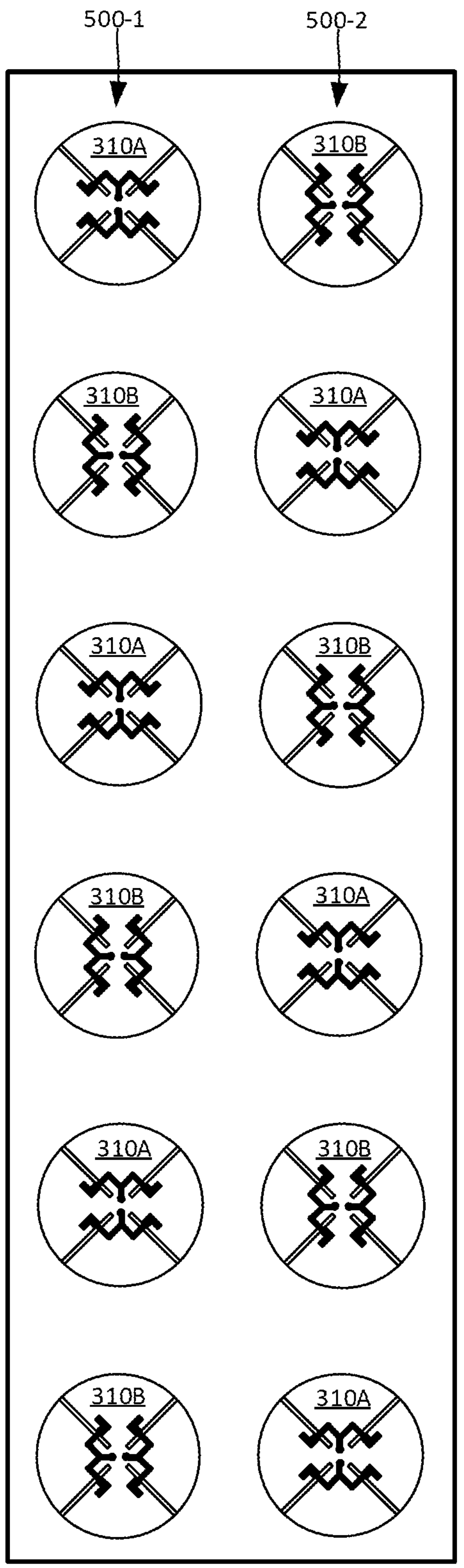
FIG. 7 is a schematic front view of base station antenna that includes two antenna arrays according to embodiments of the present invention.

FIG. 7 is a schematic front view of base station antenna that includes two antenna arrays 500-1, 500-2 according to embodiments of the present invention. The antenna arrays 500-1, 500-2 are implemented using the radiating elements 310A, 310B of FIGS. 5A-5C.

As shown in FIG. 7, each antenna array 500-1, 500-2 includes three radiating elements 310A and three radiating elements 310B. The locations of the radiating elements 310A, 310B are reversed in the two antenna arrays 500-1, 500-2 so that each radiating element 310A in antenna array 500-1 is horizontally adjacent a radiating element 310B in antenna array 500-2, and each radiating element 310B in antenna array 500-1 is horizontally adjacent a radiating element 310A in antenna array 500-2. Since radiating elements 310A, 310B emit signals at orthogonal polarizations, this arrangement may increase the degree of isolation between antenna arrays 500-1 and 500-2.

Figure 8:
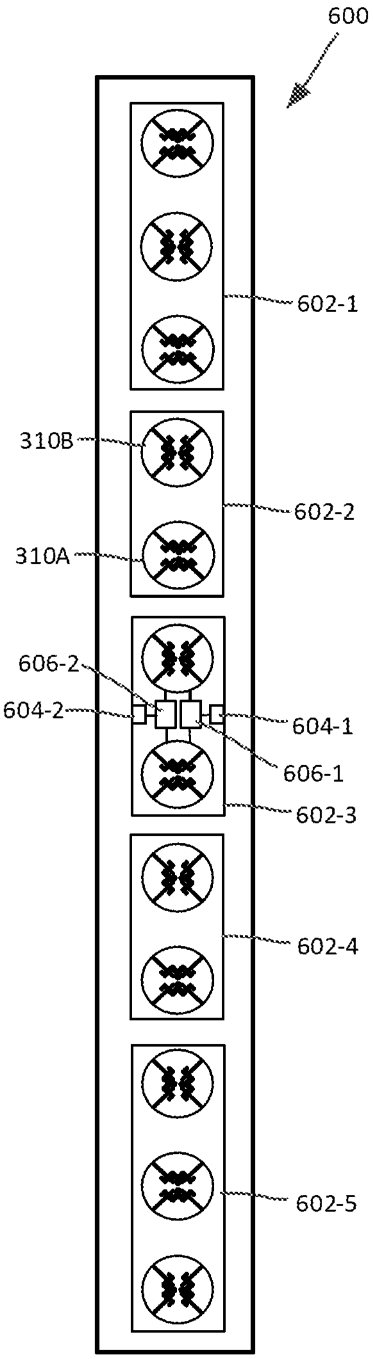
FIG. 8 is a schematic front view of an antenna array that includes feedboards having two radiating elements as well as feedboards having three radiating elements.

FIG. 8 is a schematic front view of an antenna array 600 that includes feedboard assemblies 602-2 through 602-4 that include two radiating elements as well as feedboard assemblies 602-1, 602-5 that include three radiating elements. As shown in FIG. 8, the antenna array 600 includes a total of twelve radiating elements that are implemented using six of the first radiating elements 310A of FIG. 5B as well as six of the second radiating elements 310B of FIG. 5C. As shown in FIG. 8, feedboard assemblies 602-2 through 602-4 each include one first radiating element 310A and one second radiating element 310B. Each feedboard assembly 602-2 through 602-4 may include first and second RF inputs 604-1, 604-2. The first input 604-1 may be connected to a first RF port (not shown) of a base station antenna that includes antenna array 600, and the second input 604-2 may be connected to a second RF port (not shown) of a base station antenna that includes antenna array 600. Each feedboard assembly 602-2 through 602-4 further includes a first power divider 606-1 that is coupled to the first RF input 604-1. The first power divider 606-1 may split an RF signal received at RF input 604-1 in half and supply half of the signal energy to radiating element 310A and the other half of the energy to radiating element 310B. The RF inputs 604 and power dividers 606 are only shown on feedboard assembly 602-3 in order to simplify the drawing. Thus, half the radiation emitted by, for example, feedboard assembly 602-3 in response to an RF signal input to the first RF port will have a vertical polarization and the other half will have a horizontal polarization, and hence based on superposition principles the radiation emitted by the feedboard assembly 602-3 in response to an RF signal input to the first RF port will have a −45° polarization. In a similar fashion, half the radiation emitted by feedboard assembly 602-3 in response to an RF signal input to the second RF port will have a vertical polarization and the other half will have a horizontal polarization, and hence the radiation emitted by the feedboard assembly 602-3 in response to an RF signal input to the second RF port will have a +45° polarization.

Feedboard assemblies 602-1 and 602-5, however, each have three radiating elements, and hence cannot have the same number of first radiating elements 310A and second radiating elements 310B. In order to balance the polarizations, feedboard assembly 602-1 includes two first radiating elements 310A and one second radiating element 310B, whereas feedboard assembly 602-5 includes two second radiating elements 310B and one first radiating element 310A.

Figure 9:
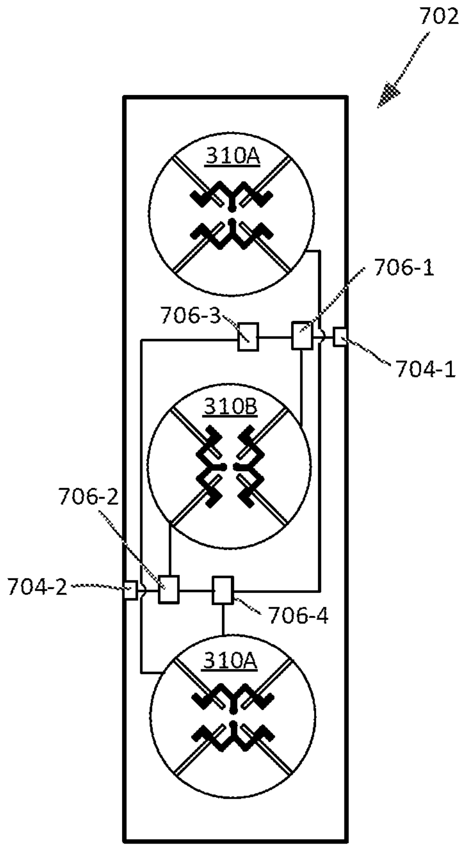
FIG. 9 is a schematic front view of a feedboard according to embodiments of the present invention that has an odd number of radiating elements.

In other cases, an antenna array may have an odd number of radiating elements. In such a situation, the approach described above with reference to FIG. 8 cannot be used to ensure that the superposition of the emitted RF energy results in a slant −45° or a +45° polarization. FIG. 9 is a schematic front view of a feedboard according to embodiments of the present invention that illustrates an alternative approach that may be used to achieve slant −45° or slant +45° polarization.

As shown in FIG. 9, an RF signal input at input 704-1 is split into two equal parts by a first power divider 706-1. A first output of the first power divider 706-1 is fed to the second radiating element 310B, while the second output of the first power divider 706-1 is input to a third power divider 706-3, which again equally splits the input power. The outputs of the third power divider 706-3 are then fed to the respective first radiating elements 310A. In this fashion, equal amounts of RF energy are output at vertical and horizontal polarizations so that a slant −45° polarized signal is obtained. Similarly, an RF signal input at input 704-2 is split into two equal parts by a second power divider 706-2. A first output of the second power divider 706-2 is fed to the second radiating element 310B, while the second output of the second power divider 706-2 is input to a fourth power divider 706-4, which again equally splits the input power. The outputs of the fourth power divider 706-4 are then fed to the respective first radiating elements 310A. In this fashion, equal amounts of RF energy are output at vertical and horizontal polarizations so that a slant +45° polarized signal is obtained.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

The which is claimed is:

1. A base station antenna, comprising:

a first radio frequency ("RF") port;

a second RF port;

a first antenna array that includes a plurality of first radiating elements and a plurality of second radiating elements, wherein each of the first radiating elements includes a first radiator that is configured to radiate at a first polarization that is connected to the first RF port and a second radiator that is configured to radiate at the first polarization that is connected to the second RF port, and each of the second radiating elements includes a first radiator that is configured to radiate at a second polarization that is connected to the first RF port and a second radiator that is configured to radiate at the second polarization that is connected to the second RF port, wherein the second polarization is different from the first polarization.

2. The base station antenna of claim 1, wherein the first polarization is a vertical polarization and the second polarization is a horizontal polarization.

3. The base station antenna of claim 1, wherein the first radiator comprises a first radiating arm that extends at an angle of approximately −45° with respect to a vertical axis and a second radiating arm that extends at an angle of approximately +45° with respect to the vertical axis.

4. The base station antenna of claim 1, wherein each first radiating element includes a first feed stalk and a first radiator unit and each second radiating element includes a second feed stalk and a second radiator unit, where the first and second radiator units are identical, and the first and second feed stalks are identical, and the first feed stalks connects to the first radiator units differently than the second feed stalks connects to the second radiator units.

5. The base station antenna of claim 1, wherein the first antenna array further comprises a feedboard, and wherein two of the first radiating elements and one of the second radiating elements are mounted on the feedboard.

6. The base station antenna of claim 5, wherein the feedboard is configured to supply higher power RF signals to the second radiating element than to the either of the two of the first radiating elements.

7. The base station antenna of claim 1, wherein the first antenna array further comprises a first feedboard that has two of the first radiating elements and one of the second radiating elements mounted thereon and a second feedboard that has one of the first radiating elements and two of the second radiating elements mounted thereon.

8. A base station antenna, comprising:

an antenna array that includes a plurality of first radiating elements that include first radiators that are configured to emit respective first sub-components of a radio frequency ("RF") signal at a first polarization and a plurality of second radiating elements that include first radiators that are configured to emit respective second sub-components of the RF signal at a second polarization, wherein the antenna array is configured so that the first and second sub-components combine to form a radiation pattern having a third polarization that is different from the first and second polarizations.

9. The base station antenna of claim 8, wherein the first polarization is a vertical polarization and the second polarization is a horizontal polarization and the third polarization is a slant polarization that is about halfway between the vertical polarization and the horizontal polarization.

10. The base station antenna of claim 8, wherein each first radiating element further includes a second radiator that is configured to emit a respective first sub-component of a second RF signal at the first polarization and each second radiating element further includes a second radiator that is configured to emit a respective second sub-component of the second RF signal at the second polarization, wherein the antenna array is configured so that the first and second sub-components of the second RF signal combine to form a second radiation pattern having a fourth polarization that is different from the first, second and third polarizations.

11. The base station antenna of claim 8, wherein each first radiator of the first radiating element includes first and second radiating arms and each first radiator of the second radiating element includes first and second radiating arms.

12. The base station antenna of claim 8, wherein the first radiating arm of the first radiator of the first radiating element extends at an angle of approximately −45° with respect to a vertical axis and the second radiating arm of the first radiator of the first radiating element extends at an angle of approximately +45° with respect to the vertical axis.

13. The base station antenna of claim 8, wherein the antenna array further comprises a feedboard, and wherein one of the first radiating elements and one of the second radiating elements are mounted on the feedboard.

14. The base station antenna of claim 8, wherein each first radiating element includes a first feed stalk and a first radiator unit and each second radiating element includes a second feed stalk and a second radiator unit, where the first and second radiator units are identical, and the first and second feed stalks are identical, and the first feed stalks connects to the first radiator units differently than the second feed stalks connects to the second radiator units.

15. The base station antenna of claim 8, wherein the antenna array further comprises a feedboard, and wherein two of the first radiating elements and one of the second radiating elements are mounted on the feedboard.

16. A base station antenna, comprising:

a reflector;

an antenna array that includes a plurality of radiating elements that extend forwardly from the reflector, each radiating element having a first radiating arm that extends at an angle of about −45° from a first vertical axis that bisects the radiating element, a second radiating arm that extends at an angle of about +45° from the first vertical axis, a third radiating arm that extends at an angle of about +135° from the first vertical axis, and a fourth radiating arm that extends at an angle of about −135° from the first vertical axis;

a first radio frequency ("RF") port that is coupled to the first and second radiating arms of each of a first subset of the radiating elements and to the second and third radiating arms of each of a second subset of the radiating elements.

17. The base station antenna of claim 16, further comprising a second RF port that is coupled to the third and fourth radiating arms of each of the first subset of the radiating elements and to the first and fourth radiating arms of each of the second subset of the radiating elements.

18. The base station antenna of claim 16, further comprising a plurality of feedboards, wherein each feedboard includes at least one of radiating elements in the first subset and one of the radiating elements in the second subset.

19. The base station antenna of claim 16, wherein each of the radiating elements is substantially identical, and each of the radiating elements in the first subset is oriented at a different rotation with respect to the radiating elements in the second subset.

20. The base station antenna of claim 19, wherein each of the radiating elements in the first subset is rotated by about 90° with respect to the radiating elements in the second subset.

* * * * *